INTERFERENCE REDUCING RADIO IMPULSE RECEIVER
Original Filed Sept. 9, 1942
FIG. 1A.
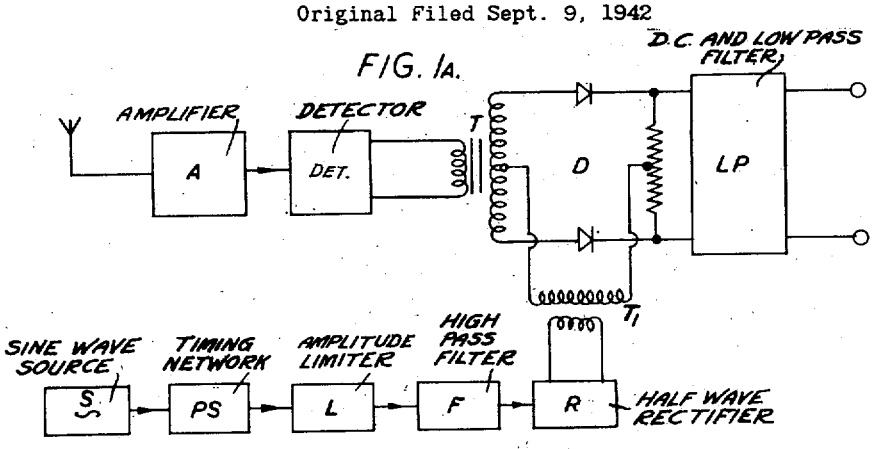
FIG. 1B.
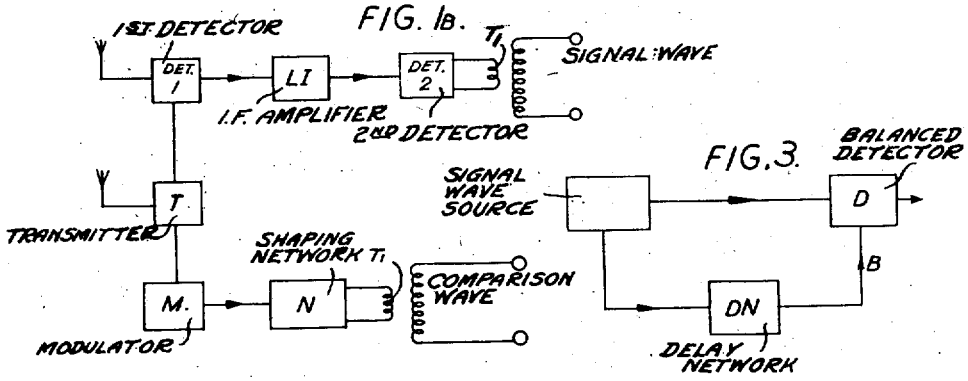
FIG. 3.
FIG. 2.
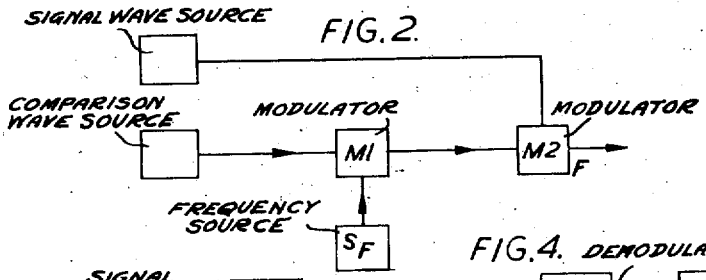
FIG. 4.
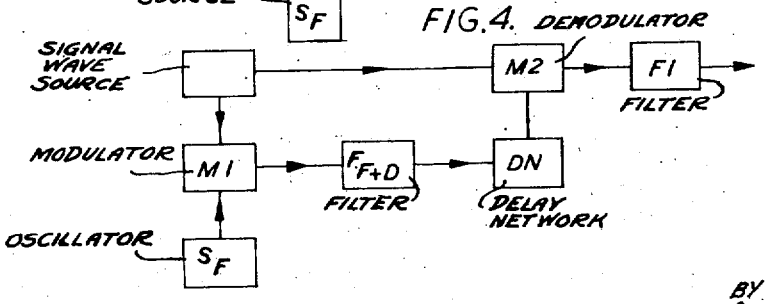
INVENTOR
Chas. Earp
BY
Loyd Hall Sutton
ATTORNEY Reissued Dec. 18, 1951

Re. 23,440

UNITED STATES PATENT OFFICE 23,440

INTERFERENCE REDUCING RADIO IMPULSE RECEIVER

Charles William Earp, London, England, assignor, by mesne assignments, to International Standard Electric Corporation, New York, N. Y., a corporation of Delaware Original No. 2,471,418, dated May 31, 1949, Serial No. 457,786, September 9, 1942. Application for reissue February 11, 1950, Serial No. 143,806. In Great Britain January 17, 1941

Section 1, Public Law 690, August 8, 1946
Patent expires January 17, 1961

6 Claims. (Cl. 250—20)

Matter enclosed in heavy brackets [ ] appears in the original patent but forms no part of this reissue specification; matter printed in italics indicates the additions made by reissue.

This invention relates to a system for the demodulation of a wave modulated by a signal wave-form which is substantially repetitive at a predetermined frequency.

In the art of obstacle detection by radio pulses, such pulses are transmitted at a known rate of 1,000 per second, for example, whereby the reflected wave from an obstacle also consists of a train of pulses of the known periodicity of 1,000 per second.

In the case of obstacle detection by frequency-sweep, a transmitted wave is varied cyclically in frequency, at, for example 60 cycles per second. The reflected wave from the obstacle is used to interact with a portion of the transmitted wave by detecting them together, when the resultant wave is, in general, of a complex nature, but is repeated 60 times per second.

It is evident that when a signal, of either the above types, is simply rectified to give a direct current as an indication of the signal, a poor discrimination is obtained against noise current even though these noise currents are random in period and phase.

An object of the present invention is to provide arrangements for the detection of signals substantially repetitive at a predetermined frequency which will discriminate against all noise which does not conform to the characteristic envelope or phase of the signal.

(It may be mentioned here that though the use of a highly selective receiver could give a certain measure of discrimination against noise, extreme selectivity must eventually exclude some component part or parts of the signal. If every component of the signal can be used without additional band width, a better solution can be expected.)

The characteristic repetitive nature of the signal does not, in itself, carry any intelligence (or information) but appears as an unwanted or spurious modulation of the demodulated information bearing signal, and causes the signal to occupy a frequency band width much greater than that which is strictly required for the transmission of the information of the signal. In the circuits described herein, for example, for distance determination of an obstacle in which the signal output consists of a direct current, in addition to a reduction of the random noises in the output demodulated signal, this unwanted or spurious modulation can be easily eliminated by filtering the output without reducing the signal level, and furthermore every component of the signal is used and the signal changed into such form that it occupies the minimum possible band width consistent with the rate of information which is required of it.

According to one feature of the invention in a system for the demodulation of a wave modulated by a signal wave-form which is substantially repetitive at a predetermined frequency, the signal wave and a locally-derived wave of the same frequency and phase and preferably of the same shape as the signal wave-form are respectively applied to the two input circuits of a differential detector or balanced modulator.

According to another feature of the invention in a system for demodulation of signal waves of the type referred to above, the signal wave is applied to a mixing device or modulator to which is also applied a locally-generated wave constituted by one or both sidebands of a carrier wave of frequency F modulated by a wave of the same frequency and phase and preferably of the same shape as the signal wave-form, the output from the mixing device being passed through a filter having a mean pass frequency F.

According to a still further feature of the invention in a system for demodulation of signal waves of the type referred to, the signal-modulated wave is fed over two paths to a modulator, one or both of such paths including a further modulator for combining the signal modulated wave with a carrier wave of constant frequency and means is provided for producing a predetermined difference in transmission delay through the two paths.

In the simplest form of the present invention, the signal wave is demodulated in a differential detector, in which one input is the signal-wave, and the other input is a locally generated wave of the same periodicity and phase and preferably of the same shape. This second input will be known as the comparison wave, which is, as nearly as possible, of the same form as the signal, but has no added noise.

In a "pulse" receiver, the comparison wave consists of a train of locally generated pulses, in which the timing is controlled, by manual or automatic tuning, so that the pulses are coincident with the received signal pulses.

In the frequency sweep receiver, the comparison wave is the same shape as the wave-form representing the frequency variation of the carrier wave. Figures 1A and 1B of the accompanying drawings show schematic block diagrams of this simple system for the two types of equipment and Figs. 2, 3 and 4 show block diagrams of three further systems according to the invention.

In Fig. 1A the signal input to the differential detector D is obtained after amplification and detection, in an amplifier A and a detector Det and application to a transformer T which removes the D. C. component of the output, but which accurately reproduces the H. F. envelope of the signal. The comparison wave is obtained by known means. For example, the timing of the wave is achieved by the phase control in a network PS of a sine-wave of pulse periodicity generated by a source S. Amplitude limiting of this wave by a limiter L produces a square wave form. Subjection to a high-pass filter F produces a series of positive and negative pulses, which are applied to a half-wave rectifier R leaving positive D. C. pulses of the correct shape, periodicity, and timing. These pulses are passed through a transformer T1, or any other high-pass filter, which removes the D. C. component, but conserves the envelope. L. P. is a D. C. and low-pass filter connected to the output of the differential detector D and filters out the unwanted spurious modulation of repetition frequency.

If we now make a "Fourier analysis" of the signal wave, it will be found to be of the form $$e_1 \sin(2\pi ft+\theta 1)+e_2 \sin(4\pi ft+\theta 2)+e_3 \sin(6\pi ft+\theta 3)+\text{etc.}$$

plus noise components which are random in frequency and phase. ("f" is the pulse periodicity.)

As the comparison wave is of the same general shape, this may be analysed as:

$$k(e_1 \sin(2\pi ft+\theta 1)+e_2 \sin(4\pi ft+\theta 2)+\text{etc.})$$

The direct current component of the output from the differential detector D is due only to identical frequency components in the two inputs, the value and sign depending upon the relative phase of the two components.

In the case of linear detectors, in which the comparison wave dominates, the total D. C. output is proportional to $$e_1+e_2+e_3+\text{etc.}\ldots$$

plus random positive and negative components due to noise.

Thus, we have a demodulating device which utilises every signal component of the original wave, adding them together arithmetically. Noise components, however, are added up as vectors, and may, for certain types of noise, tend to cancel each other out altogether.

Fig. 1B shows the equivalent circuit for the frequency-sweep equipment. The signal wave and the comparison wave are applied to a differential detector as before. In this case, the practical benefit is not so great, owing to the fact that the signal envelope is not so well defined, and that some of the noise is not completely random in form. If, for example, the typical signal envelope is derived from amplitude modulation caused by selective high frequency circuits, then the rectified noise tends to be synchronous with the transmitter frequency. It will be described later, how this disadvantage may be entirely eliminated.

In Fig. 1B the modulating wave from a modulator M is applied to the transmitter T to frequency modulate a carrier wave and a portion of the output T is applied to a first detector Det 1 in the receiver together with the received waves after reflection from the obstacle giving the difference between the received direct and reflected waves. L1 is an intermediate frequency amplifier and Det 2 a second detector. The signal wave output is from the secondary of the transformer T. The comparison wave is derived from the modulating wave, after passing if desired through a shaping network N. The signal wave and the comparison wave are applied to a differential detector as in Fig. 1A.

Referring again to the systems depicted in Figures 1A and 1B, the signal wave and the comparison wave interact to produce a direct current output. If an alternating current output is desired, this may be easily achieved by the system shown in Fig. 2.

The comparison wave is modulated by a source S of frequency F in modulator $M_1$, and the upper and/or lower sidebands of F are passed to modulator $M_2$ to demodulate the signal wave. In this case the output from $M_2$ is at frequency F, and bears a constant phase relationship to the original supply at frequency F. Output due to noise currents is also at frequency F, but this is composed of components which are random in phase. In order to avoid the difficulty that the noise envelope may not be entirely random, advantage must be taken of the fact that the phase of the noise wave is random compared with the phase of the signal wave before detection. Unfortunately, both in pulse systems and frequency sweep systems, the phase of the received wave changes rapidly according to the position of the obstacle. For example, if the obstacle moves one quarter of a wavelength nearer to the transmitter, the whole signal wave is exactly inverted in phase, owing to the reduction of total signal path-lengths by half of one wavelength. It is therefore almost impossible to generate a suitable comparison wave for demodulation with the signal before rectification of the signal.

The above difficulty can, however, be avoided as shown in Fig. 3 by splitting the signal wave into two paths, and delaying the wave in one path by means of a delay network DN by a time equal to one (or an exact multiple) period of repetition of the signal. This delayed wave may now be utilised as the "comparison wave" for demodulation of the waves in the non-delayed path in the balanced detector D.

The signal waves in the two paths are now identical and simultaneous, but the noise components of the wave being non-repetitive are random in phase and frequency. On demodulation, which may be achieved by beating together the signal waves in the two paths, the signal components produce output signal currents which add together in similar sense or phase, whereas outputs due to noise currents are random in sense or phase.

The underlying principle of operation of this method for demodulation is described in Patent No. 2,233,384, issued February 25, 1941. It is shown, in this specification, that by the use of a critical band width for the signal transmission, noise currents which are uniformly distributed over the frequency spectrum exactly cancel themselves out.

In the above mentioned application, the method was used for the demodulation of a single carrier wave, so that the delay network was arranged to be a function of the band width of the transmission circuits. In the present invention, however, we are concerned only with the demodulation of a signal which is repetitive at a substantially constant frequency "f." Such a repetition wave may, of course, be subjected to a Fourier analysis, when the various components will be found to be a number of constant frequency carrier waves which are spaced in frequency by exact intervals of "f" cycles/second. The delay network produces a linear phase distortion of the signals, this distortion being equivalent to a phase rotation of $2\pi$ radians per "f" cycles of band width.

Referring now to the system of Fig. 3, the signal wave may be represented as:

$e_1 \sin (2\pi n_1 ft+\theta 1)+$
$e_2 \sin (2\pi n_2 ft+\theta 2)+$
$e_3 \sin (2\pi n_3 ft+\theta 3)+$
etc. (where "n" is an integer) +

Noise components of indeterminate phase and frequency, which can be written as $$\Sigma N(\sin wt+\phi)$$

After subjecting this wave to a delay of $$\frac{1}{f}$$

seconds, the resulting signal currents, which are rotated in phase by exact multiples of $2\pi$, are mathematically unchanged. The noise components, however, must be written down as $$\Sigma N(\sin wt+\phi+\phi^1)$$

where $\phi^1$ is linear with "w." As, however, "w" may be of any value, $\phi^1$ may be considered to lie anywhere between 0 and $2\pi$.

Beating together the original signal wave, and the delayed or comparison wave in the differential detector D, the direct current output is due, only, to the various frequency components in one channel beating with the components of identical frequency in the other channel.

The total D. C. output may be divided into three groups, according to the derivation:

(1) Signal components beating with equivalent signal components.
(2) Noise components beating with equivalent noise components.
(3) Signal components beating with noise components of identical frequency.

Let us now consider group 1 components. Here the total output at zero frequency may be written down as $$+k(e_1^2+e_2^2+e_3^2+ \ldots$$

assuming a square law detector, or $$+k[f(e_1)+f(e_2)+f(e_3)+ \ldots]$$

for any detector law.

In either case, all signal components conspire to give a positive output.

Let us now consider group 2 components. Here the total output at zero frequency may be written down as:

$$\Sigma k(N^2 \cos \phi^1)$$

Here $\phi^1$ is random, so that addition of the various components is random in amplitude and sense. The total output may, of course, be zero, and is, in fact zero for the case of uniformly distributed noise over a frequency band of any multiple of "f" cycles, over which band $\phi^1$ rotates by an exact multiple of $2\pi$ radians.

The output at zero frequency in group 3 components is all contained within:

$$4K\Sigma e \sin (2\pi nft+\theta) \cdot N^1 \sin (2\pi nft+\phi)$$

where $N^1$ corresponds to those particular values of N which are on frequencies identical to signal frequencies. The D. C. component of this series $$=\Sigma 2KeN^1 \cos (\theta-\phi)$$

Here, as in group 2, the various components are not all of the same sign, because both $\theta$ and $\phi$ may be of any value. The summation of noise from this cause is therefore inefficient, and may result in zero output.

In the system shown in Fig. 3, we have assumed that the received wave is composed of frequency components which are exact multiples of frequency "f." This assumption is, however, not necessary, the fundamental requirement for the signal being that it is composed of a multiplicity of frequency components separated by "f" cycles, or multiples of "f" cycles.

In this system of Fig. 3, however, it is necessary that the signal components shall arrive at D in similar phase from the two paths. A small displacement in the mean frequency of the signal wave, would of course upset this condition, whereby the two waves might arrive in phase quadrature, thereby giving zero output. In cases, therefore, where the signal wave may not be accurately defined in absolute frequency—for example, if the signal wave is derived from the intermediate frequency amplifier of a radio receiver (where frequency shifts occur according to the high frequency oscillator tuning) it is desirable to make some change.

Referring now to Fig. 4, in the system there shown this difficulty has been completely avoided.

In Fig. 4 the signal-modulated wave source feeds two separate paths to the demodulator M2 as before, and a delay network DN is inserted in one path (either path is satisfactory) as before.

In one of these paths, however, the modulator $M_1$ is inserted, in which the signal-modulated wave is modulated by an oscillator S at frequency F cycles. A filter F (which may also be the delay network) selects one of the sidebands of F produced by the signal-modulated wave.

The two inputs to the demodulator are now similar to those of Fig. 3, except that in the lower path all the components of the signal and noise have been raised (or lowered )in frequency by an amount F cycles.

The output is now selected at frequency F by filter F1. This A. C. output cannot be cancelled by a slight detuning of the signal modulated wave frequency, this detuning of the wave now only causing a phase rotation of the output with respect to the oscillator S. If, for example, the mean frequency of the signal-modulated wave is raised by "f" cycles, the phase of the output rotates through $2\pi$ radians, owing to the relative phase shift of the two paths caused by the delay network.

A second modulator, similar to $M_1$, may also be included in the upper path. In this case, the filter F1 will have a mean pass frequency equal to the sum or difference frequency of the modulating oscillator S and the similar modulating oscillator of the upper path.

It should be pointed out that the noise suppression depends upon the use of a filter F1 at frequency F in the output circuit. Similarly, in Fig. 3, the D. C. component must be selected by a low-pass filter. The bandwidth of these filters must depend upon the speed of indication of the signal required, this being designed, for example, from requirements dictated by antenna commutation for directional indication of an obstacle.

What is claimed is:

1. System for the demodulation of a carrier wave present in the form of pulses occurring at a given rate of repetition, said pulses being modulated in respect to one of their characteristics for the conveyance of intelligence, comprising means for detecting the received carrier wave [in respect to said pulses,] *to derive the envelope wave of said pulses,* a source for providing a comparison wave having substantially the same repetition frequency and phase as the pulses of said carrier wave, a second detector circuit for said signal conveying pulses, *including* means for differentially modulating said signal pulses by the pulses of said comparison wave, whereby a resultant pulse wave is obtained having an improved signal to noise ratio and having said given repetition frequency, and means for filtering out said repetition frequency for application to a utilization circuit.

2. A system according to claim 1, wherein said source is energized from said first detector and further comprising means for adjusting the phase of the comparison wave pulses into agreement with that of the signal wave pulses.

3. A system according to claim 1, wherein said second detector comprises an input transformer and a rectifier in each of the secondary leads thereof, and said means for differentially modulating includes an input transformer and means for balanced application of said comparison wave pulses to said second detector.

4. A system according to claim 1, wherein said second detector and said modulating means comprise means for obtaining the arithmetical sum of said signal and comparison wave pulses only and for obtaining the vectorial addition of all other components not having said repetition frequency.

*5. A system for deriving a substantially noise free signal from a noise distorted signal wave including a wave pattern of predetermined fundamental form, recurrent at a predetermined rate,*

*the time position of said pattern conveying the signal intelligence, comprising a wave source providing a comparison wave having a component of substantially the same repetition rate and form as said wave pattern, means for adjusting the time position of said comparison wave and said wave pattern into time coincidence, balanced modulator means for differentially modulating said signal wave and said comparison wave, and filter means for selectively passing a component of the output of the balanced modulator means.*

*6. A system according to claim 5, further comprising means for energizing said wave source under control of said signal wave.*

CHARLES WILLIAM EARP.

REFERENCES CITED

The following references are of record in the file of this patent or the original patent:

UNITED STATES PATENTS

| Number | Name | Date |
|---|---|---|
| 1,343,306 | Carson | June 15, 1920 |
| 1,343,308 | Carson | June 15, 1920 |
| 1,691,076 | Mathes | Nov. 13, 1928 |
| 1,924,174 | Wolf | Aug. 29, 1933 |
| 2,036,022 | Conklin | Mar. 31, 1936 |
| 2,040,221 | Tubbs | May 12, 1936 |
| 2,067,021 | Roberts | Jan. 5, 1937 |
| 2,108,117 | Gardere et al. | Feb. 15, 1938 |
| 2,159,493 | Wright | May 23, 1939 |
| 2,171,154 | Wright | Aug. 29, 1939 |
| 2,183,714 | Franke et al. | Dec. 19, 1939 |
| 2,199,634 | Koch | May 7, 1940 |
| 2,220,183 | Ulbricht | Nov. 5, 1940 |
| 2,223,430 | Smith | Dec. 3, 1940 |
| 2,225,524 | Percival | Dec. 17, 1940 |
| 2,227,598 | Lyman et al. | Jan. 7, 1941 |
| 2,231,704 | Curtis | Feb. 11, 1941 |
| 2,233,384 | Feldman | Feb. 25, 1941 |
| 2,266,401 | Reeves | Dec. 16, 1941 |
| 2,267,732 | Hansell | Dec. 30, 1941 |
| 2,268,643 | Crosby | Jan. 6, 1942 |
| 2,350,702 | Ulbrich | June 6, 1944 |
| 2,398,490 | Atwood | Apr. 16, 1946 |
| 2,401,416 | Eaton | June 4, 1946 |
| 2,408,079 | Labin | Sept. 24, 1946 |
| 2,410,223 | Percival | Oct. 29, 1946 |